March 11, 1930.  A. NYMAN  1,750,326
INDICATING DEVICE FOR HIGH FREQUENCY CURRENTS
Filed Sept. 24, 1926   3 Sheets-Sheet 1
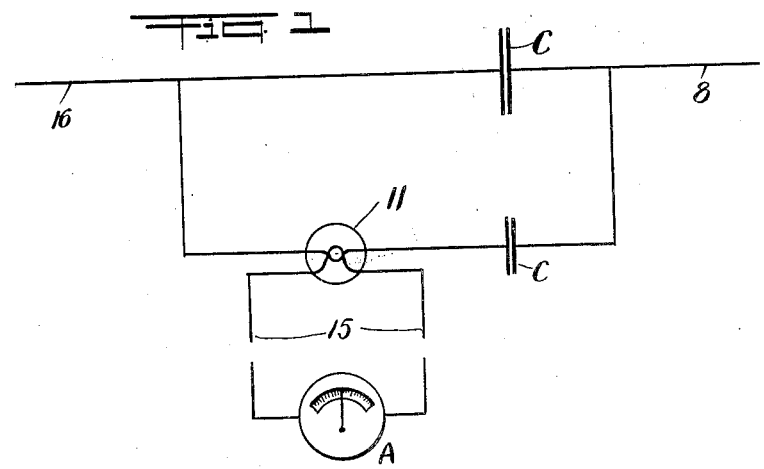
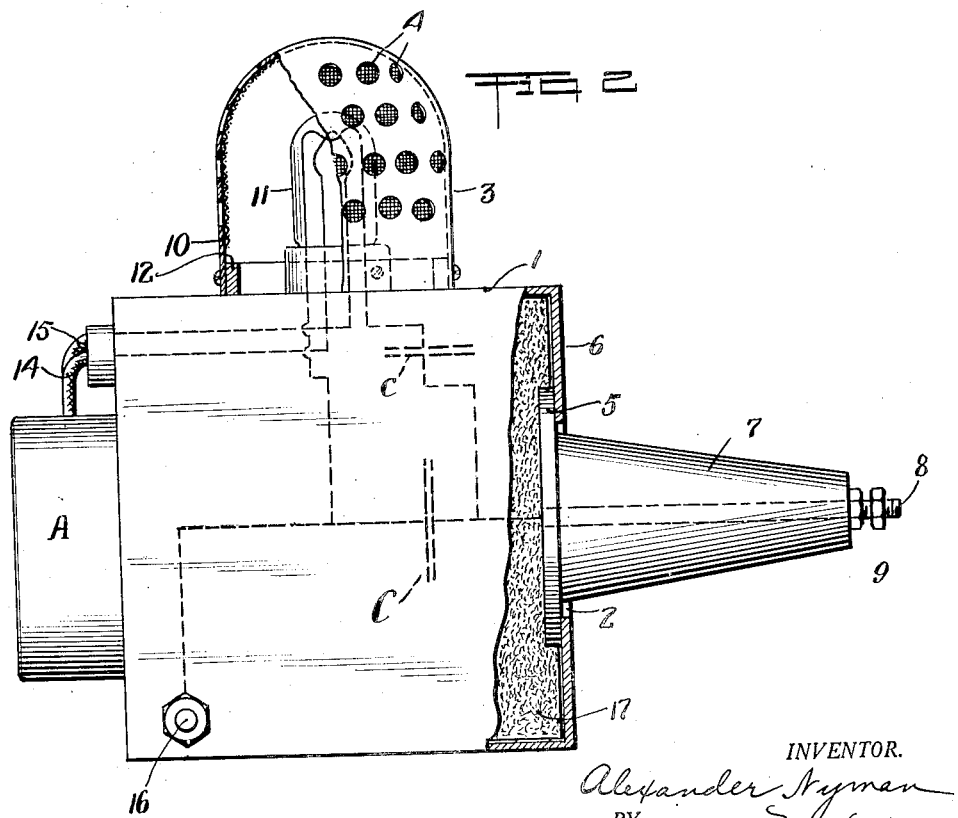
INVENTOR.
Alexander Nyman
BY William F. Nickel
ATTORNEYS.

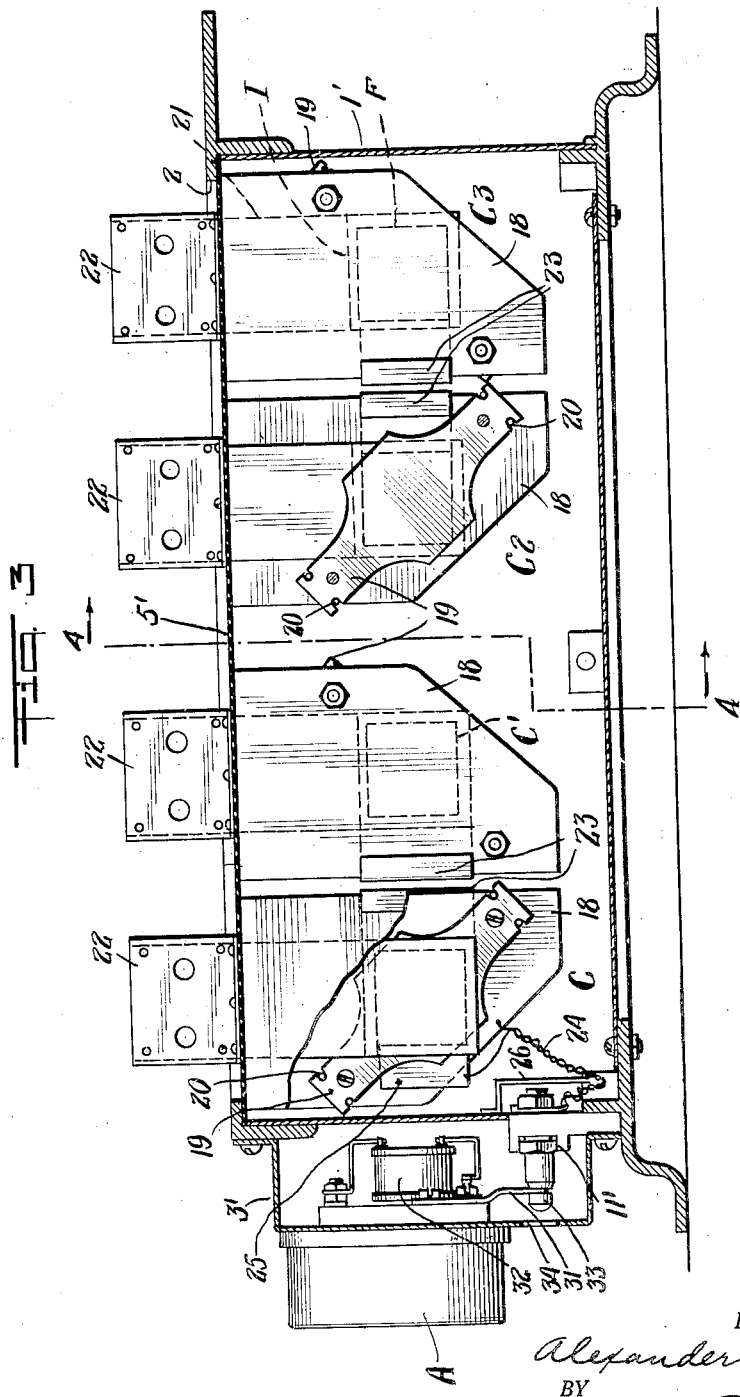

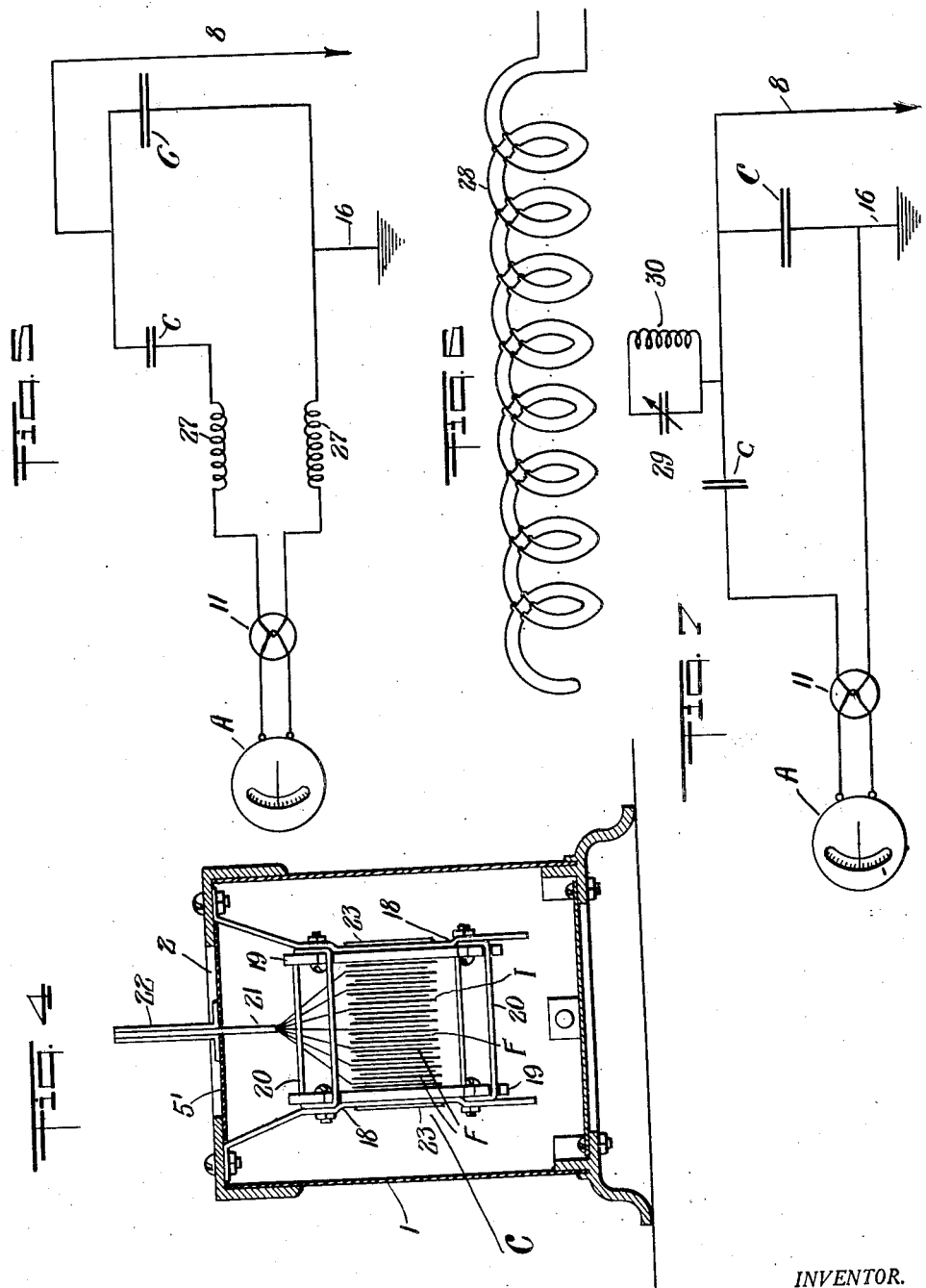

Patented Mar. 11, 1930

1,750,326

UNITED STATES PATENT OFFICE

ALEXANDER NYMAN, OF DOBBS FERRY, NEW YORK, ASSIGNOR TO DUBILIER CONDENSER CORPORATION, OF NEW YORK, N. Y., A CORPORATION OF DELAWARE

INDICATING DEVICE FOR HIGH-FREQUENCY CURRENTS

Application filed September 24, 1926. Serial No. 137,486.

This invention relates to instruments or devices for indicating or measuring oscillating electric currents of radio frequencies; and in particular to an improved device for indicating or measuring high frequency electric currents of large value, such as are frequently produced in the operation of powerful radio transmitting plants, and other kinds of electrical apparatus.

An additional object is to provide an indicating instrument adapted to be located at a distance from the operating circuit in a manner similar to the arrangement used on low frequency ammeters and voltmeters. This result can be obtained by attaching a thermo-couple close to the circuit, and making the leads from the thermo-couple as long as is necessary to reach the indicating instrument.

An object of my invention is to provide for the accurate measurement of the effective high frequency current flowing in the oscillating circuit of a continuous wave electrical oscillator of high power. Another object of my invention is the provision of means for the indication of heavy high frequency continuous wave currents that exhibit substantially no change in calibration when changes in the frequency of the radio frequency currents occur.

A further object is to provide a high frequency current indicator of simple and compact structure, with accurately calibrated scale, and especially protected against the disturbing influences of adjacent stray capacities.

In the accompanying drawings—

Figure 1 is a schematic wiring plan of the connections employed in my indicator;

Figure 2 is a partly cut away vertical front view of a device according to my invention showing the general form of the housing employed and the arrangement of certain of the constituent parts on the exterior of the casing;

Figure 3 shows in longitudinal section a preferred form of the indicator;

Figure 4 is a section on line 4—4 of Figure 3; and

Figures 5, 6 and 7 are circuit diagrams to illustrate ways of preventing disturbances in the operation of the device.

Like figures of reference denote the same parts wherever they are shown.

It is well known that for the measurement of large electric currents, the usual practice is to use some form of ammeter. In order to avoid the passage of large currents through the moving portion of the instrument some form of shunt is employed. In the measurement of alternating currents of radio-frequency, however, it is a familiar dictum that ammeters must not be shunted, since usually the inductances of the instrument and of the connected shunt are in a different ratio from that of the resistance, and hence the current distribution will vary with the frequency. Serious errors of indication may thus occur and the use of shunts of large carrying capacity should be avoided. To obviate the use of shunted instruments it has been customary in high frequency measurements to employ hot wire instruments consisting of numerous parallel heating elements each supposed to carry equal portions of the heavy current. In reality such an ammeter is only a variety of shunted instrument and hence it is difficult to make these ammeters accurate at radio-frequencies. Also errors due to differences in the resistances of the individual wires and strips employed in such ammeters may often be quite material. Further these thermal instruments almost invariably show a zero shift which is not only undesirable, but often troublesome in making accurate measurements, even when the meter is provided with a so-called zero-adjustment.

Since shunts of the ordinary type cannot be used in the accurate measurement of large currents at radio frequencies, the employment of current transformers with or without iron cores, in conjunction with suitable specially calibrated indicating instruments, has been much in vogue. A full discussion, however, of the merits and demerits of this type of instrument would be beyond the scope of this specification and it is sufficient to state, that while for certain purposes and under special conditions, these instruments possess on the one hand certain advantages such as: simplicity of construction, small inductance and capacity of their primary turns, and complete insulation of the indicating circuit from the main circuit, etc., on the other hand they frequently overheat and the coils become damaged and errors in readings occur.

To obviate the above narrated disadvantages and to impart greater reliability and constancy of action to my improved indicating meter for large high frequency currents, I employ the combination of elements described below in full.

Referring first to Figure 2 I show in side view, partly broken away, a casing 1 which is preferably of light metal or of other suitable material, lined with conductive metal foil, and within and upon which the several elements of the apparatus are mounted securely. In the back wall of the metal casing is an aperture 2, closed by a thick sheet of mica 5 bearing an attached sleeve or pillar 7, of insulation which surrounds and supports the conducting stem 8, provided with a thread for fastening nuts 9.

On the top of casing 1, a socket 10 adapted to receive a vacuum bulb thermo-element 11 is located. Projecting from the outer surface of the metal top, a circular rib or ring 12, encircles the socket, and serves to maintain in position the dome shaped cover 3, for the element 11. As the function of this cover is to protect the enclosed element 11, from the effects of stray electrostatic capacity fields, it is made of metal and perforated with a number of holes 4. Its presence also prevents excessive circulation of cooling air about the bulb and thus stabilizes the radiation, although sufficient radiation is allowed to avoid overheating of the thermo junction in the element 11. Meter A is fixed upon the front of the casing and is thus screened from the highly charged elements within the container 1. Wires 15 attached to the terminals of this ammeter pass through insulator bushings 14, and connect with the proper terminals on the socket bearing the thermo-couple bulb 11.

The casing 1 is provided at 16, or elsewhere if desired, with a binding post for earthing the entire casing.

Within the casing 1, securely fixed and embedded in high grade insulating wax 17, are two condensers, shown at C and $c$ in Figure 1. The capacity of C is many times that of $c$. Both condensers are composed of specially selected material, preferably high grade mica. Any losses occurring in them at radio-frequencies must be exceedingly minute. In Figure 1, the plan of the connections of the various parts of the instrument is shown diagrammatically. It is as follows: Condenser C of larger capacity in the casing 1, has one of its terminals connected to the high potential terminal 8, which is joined to one of the leads of the oscillating circuit including antenna, test apparatus, etc. The other terminal 16 of the condenser C may be attached to casing 1, which is earthed or grounded if desired. The condenser C is thus the series condenser. The small condenser $c$ of much less capacity than C, is connected in series with the thermo-element 11, and both are in shunt across the terminals of the large condenser C, the ammeter A is then connected to the terminals of the thermo-element in the tube 11. When the condensers are connected in the aforesaid manner and to the outside oscillating circuits, the large radio frequency current will divide between the two branch circuits formed by the electrical appliances or the condensers C and $c$. In general the intensity of current traversing each branch will depend upon the capacities of the condensers, and particularly so, where precautions have been taken in the choice of the material composing the condensers in their construction and in the design of their mounting, so that only negligible variations of their equivalent capacity occur with varying high frequencies. For example: if the capacity of the large series condenser C be about .099 mfd., and sufficient power be used to force an effective current of 100 amperes through the combined condensers, the capacity of the shunting condenser $c$ may be only .001 mfd. Ample current would thus traverse the non-inductive thermo-element and generate enough E. M. F. to produce a large deflection of the index pointer (not shown) of the calibrated indicating meter A. Hence, when known ratios of condensers of accurate capacity are used multiplication of the scale indications by the calculated multiplier to obtain a true reading is a very simple matter.

In the combination as herein-described, the inclusion of a thermo-element connected in series with the shunting condenser $c$, has been especially emphasized; since, owing to its use particular advantageous and novel effects as regards the stabilization of the resistance of the shunt circuit with respect to various radio frequencies are produced. It is apparent that indications, at least of a kind, may be obtained by connecting a sufficiently sensitive high frequency ammeter of the usual type in the place of the thermo-element, the meter thus being in series with the small shunting condenser. But, owing to the magnitude of the inductance, resistance, and capacity of the conductive elements of the meter and its connecting leads, changes in the ratio of the currents would usually occur upon variations in the frequency of the radio current. The proportionality of the current through the shunting condenser $c$, would vary therefore with the different frequencies and the resultant deflections of the meter would not be truly indicative of the total actual current.

Employment of a thermo-couple with its short leads of small capacity and inductance and closely located to the leads of the condenser, and very low resistance tending to vary the impedance but little with changes of frequency minimizes the above described causes of uncertainty and markedly stabilizes the respective amounts of the currents that exist in the two branches containing the condenser C, and the condenser c and thermo-element 11 at various radio frequencies within reasonable limits. Accurate indication of the current in the shunt circuit is thus secured.

The ammeter A can be used at a distance from the operating circuit, the same as ordinary ammeters and voltmeters. In such a case the thermo-couple will be close to the operating circuit and the leads therefrom to the ammeter will be screened to prevent disturbances of the instrument.

Figures 3 and 4 show a preferred form of my indicating device comprising a casing 1', which is preferably made with its sides, ends, and bottom perforated so as to allow circulation of air through the interior. This casing is made to contain four separate condensers indicated at C, C', C², and C³ in Figure 3. Each of these condensers is supported by means of suspension members 18 attached to the top of the casing, and the condensers each comprises a body secured between clamping members 19, held together by a fastening means, such as wire 20 wrapped around the ends of the clamping members 19. Each condenser may be made up of a suitable number of sheets of insulation, such as mica I alternating with sheets of metal foil F. The top of the casing 1' has an opening 2 closed by a sheet of insulation 5', and the terminals of each of the condensers pass through the sheet of insulation 5', the terminals being indicated at 21. These terminals may be metal strips soldered to metal foils F and extended far enough to pass out through the top of the casing, and above the sheet of insulation 5', they may be disposed between plates 22 of conductive material affixed to the sheet 5', the plates 22 serving to make the terminals strong and adapted to be attached to a conductor to join the indicating device into the electrical circuit. Any suitable arrangement of the sheets of mica I and the sheets of foil F may be adopted, and I prefer to connect each of the condensers to its terminal by a metal strip 21 on one side, and to the suspension members 18 by metal strips 23 on the other side. Half of the sheets of foil F of each condenser will be joined to the terminal 21, and the remaining foils will be connected equally to the two strips 23. The members 18 and 19 and the casing 1' being of metal, each condenser will thus be grounded upon the casing. To unite the ends of each of the condensers to the suspension members 18, I may use, at the ends of the condensers, sheets of copper or other metal 23, which can be turned over the side of the adjacent suspension member 18 and soldered, or otherwise secured to this suspension member, as indicated at 23 in Figures 3 and 4. The current to the condenser is balanced by dividing it between one of two connections 23 and the corresponding suspension members 18, as shown in Fig. 4, which are located parallel to and equidistant from the conductor 21. The current passing through the suspension members 18 is opposite in direction to that passing through conductor 21, thus producing a balancing of the magnetic action due to this current. In practice, the indicating device may work with a single condenser C, one extremity of the circuit being joined to the terminal 22, and the other to the casing 1', in any desired place or manner. Under necessary conditions I may also use one, two or three of the remaining condensers in combination with the condenser C and in each case the condensers employed in addition to the condenser C will be united to the same extremities of the circuit as the condenser C, through its terminals 22, so that whenever more than one condenser is used, the condensers actually in operation will be in parallel with each other.

The thermo-couple is indicated at 11' and may have any desired construction, and be within a suitable block or body from which leads extend to the ammeter A. The ammeter is mounted upon a cover or housing 3' which encloses a compartment containing the block 11', and the inner terminals of the ammeter A, which may be provided with parts of suitable design including heavy studs for supporting the meter or enabling connections to be made by strips 31 to the meter from the thermo-couple. These strips 31 lead to a resistance in a housing 32 on the back of ammeter A to compensate for the leads to the ammeter. The strips are held to the thermo-couple by screws 33, adjacent holes 34, so that the screws can be loosened and the ammeter disconnected to be mounted at a distance. From the thermo-couple extend two leads 24 to the condenser corresponding to the small condenser c above mentioned. This small condenser c may be provided by part of the first condenser C, as by making one or more of the intermediate sheets of metal foil F of greater length so that part of it projects as shown at 25 in Figure 3. One of the leads 24 will be connected to the projecting end 25 of this sheet of metal foil, and the other to the adjacent suspension member 18 of the condenser C. Thus, a portion of the condenser C comprising sheets of foil similar to sheets 25 and adjacent sheets, serve in place of the small condenser c above mentioned, and is in parallel with condenser C. Between the points of connection of the leads 24 with the thermo-couple, and the points of connection of the opposite extremities of these leads with the condenser, I place a perforated screen 26. The leads 24 should be close together to minimize the inductance effect, and should be of fairly heavy wire, and the screen 26 prevents the strong magnetic and electric field adjacent the condenser C from affecting the thermo-couple.

The thermo-couple and meter in practice have comparatively low resistance as compared with other types of meters, and for that reason only a small condenser $c$ is required even at frequencies as low as 50,000 cycles, without any appreciable error.

The use of more than one condenser C in the casing 1' permits the same device to be used for currents of varying strength, since for relatively large currents more capacity can be included in circuit by connecting in two or more of the condensers in parallel with the working circuit, as above stated.

In Figures 5, 6 and 7 I show the same circuit as in Figure 1 with means for preventing disturbances in the operation of the device. In practice, the circuits within the indicating device have a natural period of oscillation of their own, and should the device be connected to an outside circuit of the same period, very large current will flow through the instrument, and no readings can be obtained. Figure 5 shows two resistance elements 27 in the leads passing to the terminals of the thermo-couple to damp the circuit within the casing. These resistance devices will prevent the generation of such high currents within the casing by damping the circuits. Figure 6 shows a coil similar to the coil 27, the turns of which are doubled upon themselves as indicated at 28, to make a non-inductive winding which will present actual resistance to the flow of currents therethrough. One of these coils 28, or two of them, can be employed in the same position as the coils in Figure 5. Another way of damping the circuit within the casing 1' is to connect together a variable condenser and inductance coil in parallel (as in Fig. 7) and join one end of this combination to the lead connecting the condensers C and $c$, then any oscillations in the circuit through the condensers and thermo-couple will be effectively damped by the losses in this closed circuit.

The connections shown in Figures 5, 6 and 7 can be disposed inside the casing 1' in any suitable way and incorporated with the circuits of the device.

Having described my invention, what I believe to be new and desire to secure and protect by Letters Patent of the United States is:—

1. An indicating device comprising an electrical condenser, a shunt circuit connected to the terminals of said condenser, a condenser of smaller capacity in said shunt circuit, a measuring instrument, and a thermocouple in the shunt circuit for connecting said instrument with the shunt circuit.

2. The combination of a metallic container, a condenser in said container, a second condenser of smaller capacity in the container, a thermo-element, and a measuring instrument on the outside of the container, said element and said condenser of smaller capacity being in parallel with the first-named condenser, and the measuring instrument being connected to afford readings of the current passing through the condenser of smaller capacity, and the thermo-element.

3. The combination of a metallic container, a condenser in said container, a second condenser of smaller capacity in the container, a thermo-element, and a measuring instrument on the outside of the container, said element and said condenser of smaller capacity being in parallel with the first-named condenser, and the measuring instrument being connected to afford readings of the current passing through the two condensers, and the thermo-element, and a perforated cover on the casing for the thermo-element.

4. An indicating device comprising a condenser, means for connecting the device to an outside operating circuit, a second condenser and a thermoelement in shunt with the first condenser, and at least one device connected to the second condenser and said element to dampen disturbing oscillations induced from the outside operating circuit.

5. An indicating device comprising a condenser, means for connecting the device to an outside operating circuit, a second condenser and a thermoelement in shunt with the first condenser, and means in operative relation thereto to dampen disturbing oscillations induced from the outside operating circuit.

6. An indicating device comprising a condenser, means for connecting the device to an outside operating circuit, a second condenser and a thermoelement in shunt with the first condenser, and another device to dampen disturbing oscillations induced from the outside operating circuit, said devices comprising an inductance and a condenser with one terminal connected to the shunt circuit.

7. An indicating device comprising a casing, a measuring instrument supported on said casing, a plurality of condensers of large capacity in said casing adapted to be connected in parallel with an outside circuit, and a condenser of relatively small capacity in operative relation with said instrument to convey a portion of the total current in the outside circuit.

8. An indicating device comprising a casing, a plurality of condensers in said casing, said condensers being clamped and having suspension members to attach them to the top of the casing, each of said condensers having a high tension terminal passing through the casing to the exterior, a measuring instrument at one end of the casing, a thermo-element connected at one end to the measuring instrument, and at the other end to a portion of one of said condensers, said condensers being adapted to be connected in parallel to an outside circuit.

9. An indicating device comprising an electrical condenser, a shunt circuit connected to the terminals thereof, and a condenser in said shunt circuit, a measuring instrument, and means for connecting said instrument with the shunt circuit, with one connection of the first condenser through two balanced conductors, these balanced conductors serving as supports for the condenser.

10. An indicating device comprising an electrical condenser, a shunt circuit connected to the terminals thereof, and a condenser in said shunt circuit, a measuring instrument, and means for connecting said instrument with the shunt circuit, with one connection of the first condenser through two balanced conductors, these balanced conductors screening the other leads.

In testimony whereof I affix my signature.

ALEXANDER NYMAN.